(12) United States Patent
Corsmeier (10) Patent No.: US 11,084,096 B2
(45) Date of Patent: Aug. 10, 2021

(54) MOVABLE WALL FOR ADDITIVE POWDER BED

(71) Applicant: GENERAL ELECTRIC COMPANY, Schenectady, NY (US)

(72) Inventor: Donald Michael Corsmeier, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 429 days.

(21) Appl. No.: 15/679,945

(22) Filed: Aug. 17, 2017

(65) Prior Publication Data
US 2019/0054531 A1 Feb. 21, 2019

(51) Int. Cl.
| | | |
|---|---|---|
| *B22F 10/20* | (2021.01) | |
| *B29C 64/245* | (2017.01) | |
| *B29C 64/25* | (2017.01) | |
| *B29C 64/153* | (2017.01) | |
| *B33Y 10/00* | (2015.01) | |
| *B33Y 30/00* | (2015.01) | |
| *B22F 10/30* | (2021.01) | |

(52) U.S. Cl.
CPC .......... *B22F 10/20* (2021.01); *B29C 64/153* (2017.08); *B29C 64/245* (2017.08); *B29C 64/25* (2017.08); *B33Y 10/00* (2014.12); *B33Y 30/00* (2014.12); *B22F 10/30* (2021.01); *B22F 2999/00* (2013.01)

(58) Field of Classification Search
CPC ............................. B22F 3/1055; B29C 64/00
See application file for complete search history.

(56) References Cited

U.S. PATENT DOCUMENTS

| | | | |
|---|---|---|---|
| 4,811,564 A * | 3/1989 | Palmer ................. | F03G 7/065 60/527 |
| 4,863,538 A | 9/1989 | Deckard | |
| 5,354,414 A * | 10/1994 | Feygin ................. | B22C 9/00 216/34 |
| 5,460,758 A | 10/1995 | Langer et al. | |
| 6,355,086 B2 | 3/2002 | Brown et al. | |
| 8,875,392 B2 | 11/2014 | Richter | |
| 9,174,392 B2 | 11/2015 | Hartmann | |
| 9,327,450 B2 | 5/2016 | Hein et al. | |

(Continued)

FOREIGN PATENT DOCUMENTS

| | | |
|---|---|---|
| CN | 102950285 A | 3/2013 |
| DE | 102013018031 * | 6/2015 |

(Continued)

OTHER PUBLICATIONS

Extended European Search Report and Opinion issued in connection with corresponding EP Application No. 18187789.5 dated Nov. 28, 2018.

(Continued)

*Primary Examiner* — Nicholas A Wang
(74) *Attorney, Agent, or Firm* — Dinsmore & Shohl LLP (57) ABSTRACT

An additive manufacturing apparatus for building an object is provided. The apparatus includes a build chamber having at least one chamber wall, a powder delivery mechanism, and a build platform. The build chamber and build platform defines while in operation a powder bed. At least one surface of the build chamber or build platform is moveable in a manner that is capable of adjusting forces on the object in the powder bed.

10 Claims, 10 Drawing Sheets

(56) References Cited

U.S. PATENT DOCUMENTS

| | | |
|---|---|---|
| 9,498,848 B2 | 11/2016 | Garry |
| 9,533,372 B2 | 1/2017 | O'Neill |
| 9,550,325 B2 | 1/2017 | Sievers et al. |
| 9,597,730 B2 | 3/2017 | Mironets et al. |
| 2009/0267269 A1* | 10/2009 | Lim .................... B29C 67/0059 264/401 |
| 2010/0090374 A1* | 4/2010 | Dietrich ................ B29B 13/007 264/497 |
| 2012/0009073 A1 | 1/2012 | Hsieh |
| 2014/0302188 A1 | 10/2014 | Rix et al. |
| 2016/0059308 A1* | 3/2016 | Volk ...................... B29C 64/245 428/615 |
| 2016/0368214 A1 | 12/2016 | Sasaki et al. |
| 2017/0037674 A1 | 2/2017 | Hooper et al. |
| 2017/0050378 A1* | 2/2017 | Ederer .................. B29C 64/165 |

FOREIGN PATENT DOCUMENTS

| | | | |
|---|---|---|---|
| JP | 2012-224906 A | | 11/2012 |
| JP | 2012224906 A | | 11/2012 |
| JP | 2015501245 A1 | | 1/2015 |
| JP | 2017087529 | * | 5/2017 |
| JP | 2017087529 A | | 5/2017 |

OTHER PUBLICATIONS

English Translation of Japanese office action for application JP2018-152836 dated Jan. 7, 2020 (9 pages).

English Translation of Chinese office action for application 201810933287.1 dated Jun. 2, 2020 (19 pages).

\* cited by examiner

MOVABLE WALL FOR ADDITIVE POWDER BED

INTRODUCTION

The present disclosure generally relates to additive manufacturing (AM) apparatuses and methods to perform additive manufacturing processes. More specifically, the present disclosure relates to apparatuses and methods that enable a continuous process of additively manufacturing a large annular object or multiple smaller objects simultaneously, such as but not limited to components of an aircraft engine.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. No. 4,863,538 and U.S. Pat. No. 5,460,758, which are incorporated herein by reference, describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Figure 1:
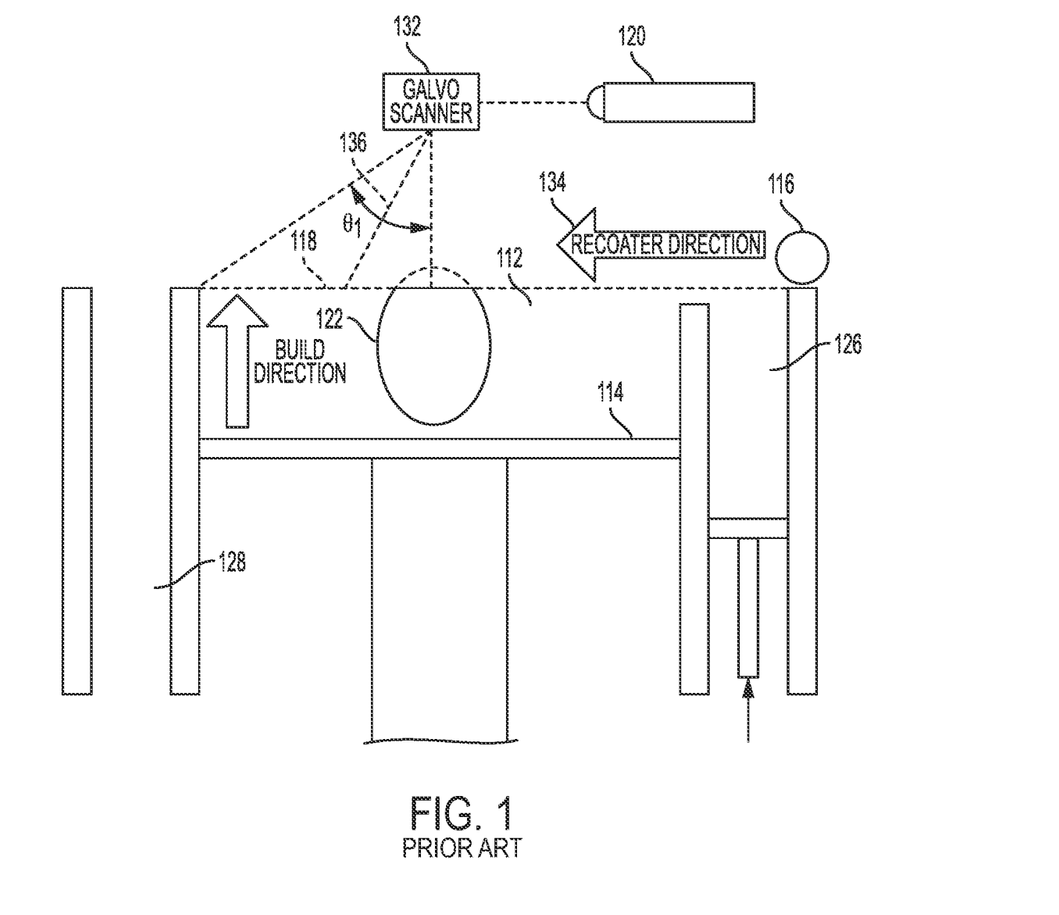
FIG. 1 is a diagram of a conventional apparatus for DMLM using a powder bed.

FIG. 1 is a diagram showing a cross-sectional view of an exemplary conventional system 100 for direct metal laser sintering ("DMLS") or direct metal laser melting (DMLM).

The apparatus 100 builds objects, for example, the part 122, in a layer-by-layer manner by sintering or melting a powder material (not shown) using an energy beam 136 generated by a source 120, which can be, for example, a laser for producing a laser beam, or a filament that emits electrons when a current flows through it. The powder to be melted by the energy beam is supplied by reservoir 126 and spread evenly over a powder bed 112 using a recoater arm 116 travelling in direction 134 to maintain the powder at a level 118 and remove excess powder material extending above the powder level 118 to waste container 128. The energy beam 136 sinters or melts a cross sectional layer of the object being built under control of an irradiation emission directing device, such as a galvo scanner 132. The galvo scanner 132 may include, for example, a plurality of movable mirrors or scanning lenses. The speed at which the laser is scanned is a critical controllable process parameter, impacting how long the laser power is applied to a particular spot. Typical laser scan speeds are on the order of 10 to 100 millimeters per second. The build platform 114 is lowered and another layer of powder is spread over the powder bed and object being built, followed by successive melting/sintering of the powder by the laser 120. The powder layer is typically, for example, 10 to 100 microns.

The process is repeated until the part 122 is completely built up from the melted/sintered powder material.

The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

Figure 2:
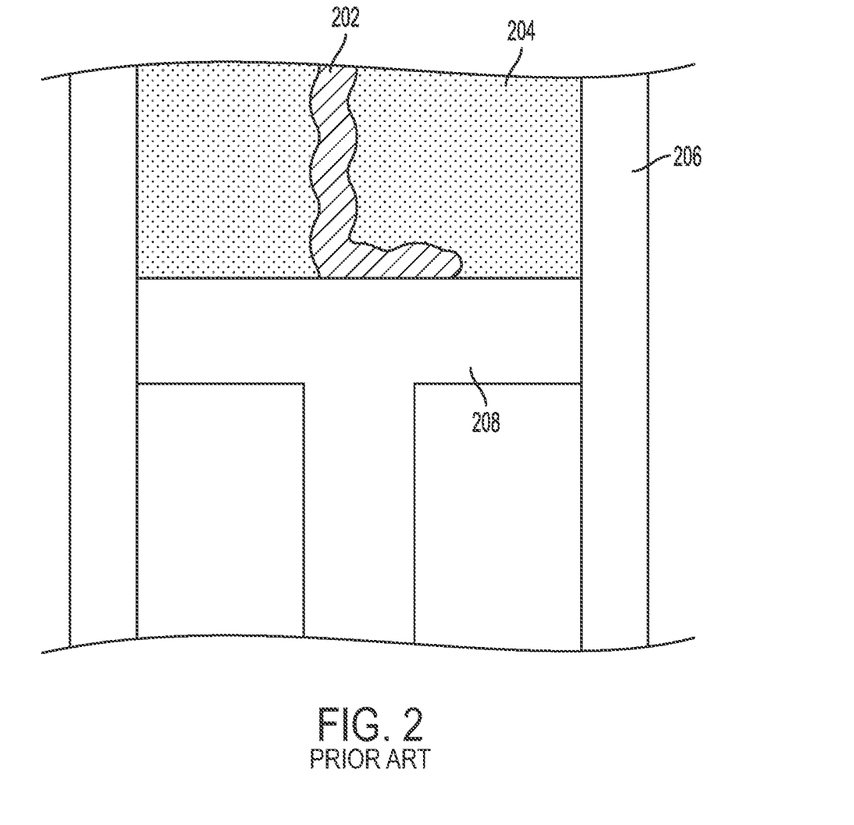
FIG. 2 is a diagram of a conventional powder bed box.

FIG. 2 is a diagram of a conventional powder bed 204. It may be understood by those skilled in the art that the powder bed 204 may be configured, for example, similarly to the powder bed 112 of the conventional apparatus for DMLM as illustrated in FIG. 1. While the other mechanical components of the conventional apparatus are not shown, FIG. 2 shows a build platform 208 on which an object 202 is built. A layer of powder is spread over the powder bed 204 as the object 202 is being built, followed by successive melting/sintering of the powder by the laser 120 (see FIG. 1). The process is repeated until the part (object 202) is completely built up from the melted/sintered powder material.

During the building or growing process, however, some powder bed additively manufactured parts fracture or distort because the powder bed, due to part shrinkage, exerts excessive pressure on the growing part. Powder trapped within a growing part, or between the part and the powder box walls, can exert excessive pressure on the part causing part fractures and distortion. Additionally, powder trapped between the powder chamber floor and grown part limits the ability of the part to shrink as it cools which can result in part fractures and distortion.

Thus, there remains a need to grow large fracture free undistorted parts and manage powder bed loading on parts manufactured in a powder bed.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The foregoing and/or aspects of the present invention may be achieved by an additive manufacturing apparatus for building an object. In an aspect, the apparatus includes a build chamber having at least one chamber wall, a powder delivery mechanism, and a build platform. The build chamber and build platform defines while in operation a powder bed. At least one surface of the build chamber or build platform is moveable in a manner that is capable of adjusting forces on the object in the powder bed.

The foregoing and/or aspects of the present invention may also be achieved by an apparatus for additive manufacturing of an object. In an aspect, the apparatus includes a powder dispenser, an irradiation source, and a platform on which the object may be built. The apparatus also includes a recoater providing layers of powder over the platform and a powder bed having chamber walls. At least one of the chamber walls having a movable portion to control powder surrounding the object being built in the powder bed.

The foregoing and/or other aspects of the present invention may be achieved by a method of fabricating an object. In an aspect, the method includes (a) depositing a given layer of powder onto a build platform in a build chamber of a powder bed; (b) fusing the given layer of powder in the powder bed to form a given fused region; (c) depositing a subsequent layer of powder; and (d) repeating steps (b) and (c) until the object is formed in the powder bed. At least one surface of the build chamber or a portion of the build platform is moved to adjust forces on the object in the powder bed.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. For example, the present invention provides a preferred method for additively manufacturing metallic components or objects, and preferably these components or objects are used in the manufacture of jet aircraft engines. In particular, large, annular components of jet aircraft engines can be advantageously produced in accordance with this invention. However, other components of an aircraft and other non-aircraft components may be prepared using the apparatuses and methods described herein.

The present invention provides a large-scale additive manufacturing apparatus and embodiments of the apparatus that can be used to perform powder bed based additive manufacturing, including but not limited to selective laser sintering (SLS), selective laser melting (SLM), direct metal laser sintering (DMLS), direct metal laser melting (DMLM) and electron beam melting (EBM) processes. The present invention also includes methods for utilizing the apparatus or an embodiment thereof to additively manufacture objects.

Accordingly, an apparatus of the present invention may provide a powder bed configured to limit structural loading on a built component via trapped powder either within the confines of the part or between the part and the walls of a build chamber. The powder bed may be configured to accommodate dimensional differences resulting from the thermal state of the constructed part and/or confined powder and/or the build chamber during or after the build process. The apparatus of the present invention may also provide a powder bed with chamber walls configured with soft self-compensating features that can move to increase chamber volume during a high thermal state and decrease the chamber volume during a low thermal state. The present invention may provide a chamber system that uses energy absorbing components such as, for example, springs to create a load-limiting powder bed with automatic volume compensation. According to an aspect, the present invention may be configured such that the build chamber and a build platform on which the object is built, may be moveable in a manner capable of adjusting forces or relieving stress on the object in the powder bed.

Figure 3A:
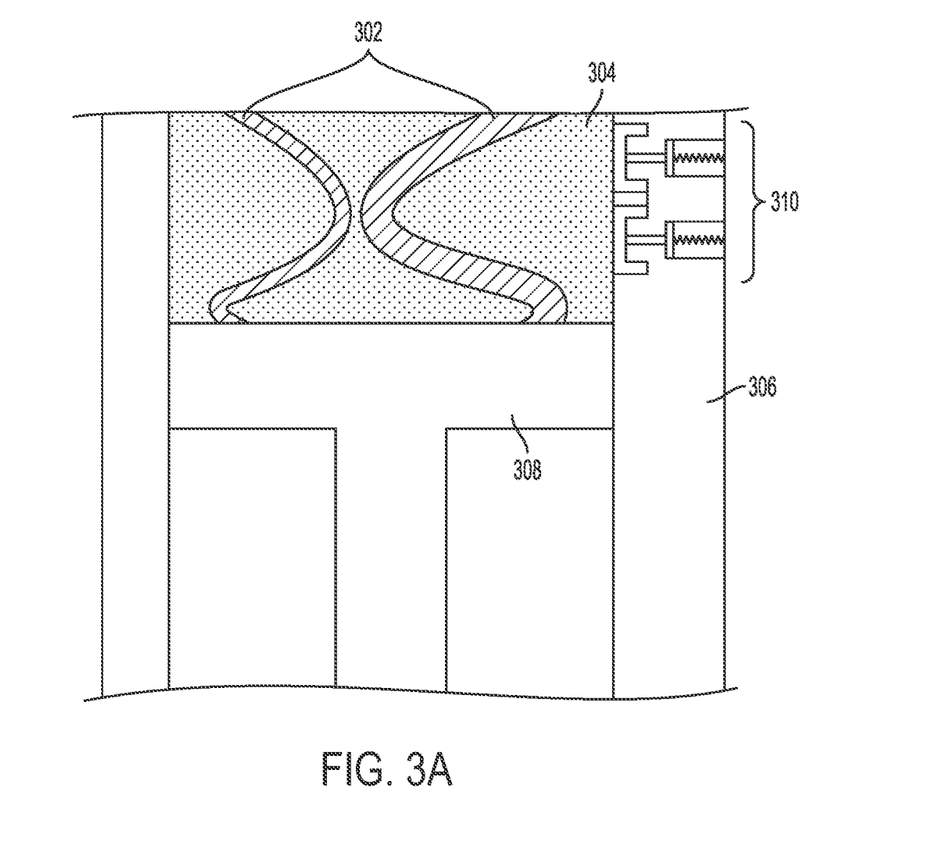
FIGS. 3A and 3B are diagrams of a powder bed box, according to an embodiment of the present invention.
Figure 3B:
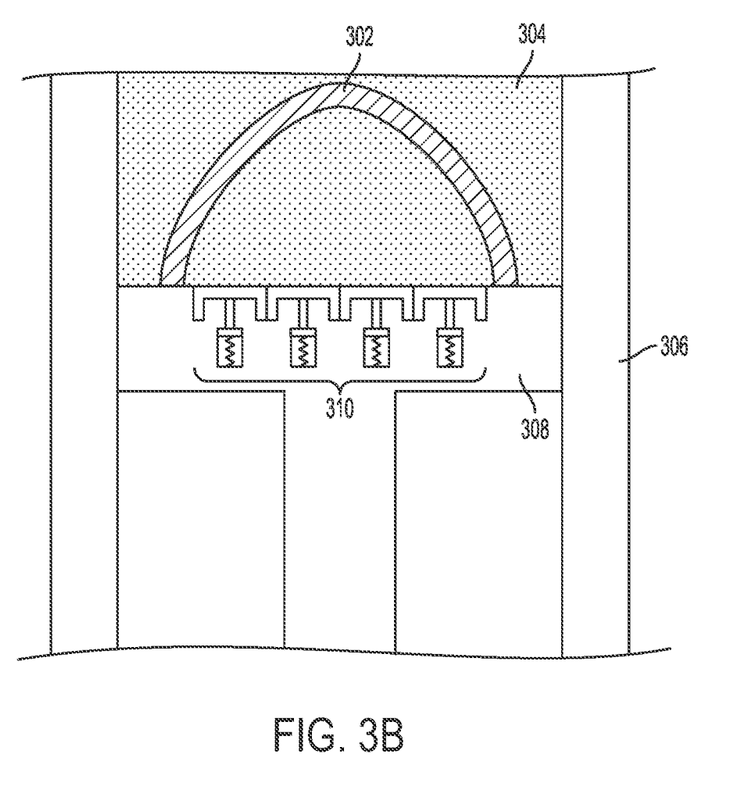

FIGS. 3A and 3B are diagrams of a powder bed box, according to an embodiment of the present invention. As shown in FIG. 3A, during a build process, a build platform 308 is lowered and then, another layer of powder is spread over a powder bed 304 to grow part 302. The process is repeated until the part 302 is completely built up from melted or sintered powder material. According to an embodiment of the present invention, the powder bed 304 may include a chamber wall 306 which may be segmented. Each segmented portion of the chamber wall 306 may be loaded with springs 310 to apply force to the chamber wall 306. For example, the chamber wall 306 may be spring loaded with springs 310 so that the wall 306 may give way as needed to allow powder in the powder bed 304 to move. As such, the part 302 may shrink as needed. The present invention is not limited to a spring loaded wall. FIG. 3B shows an exemplary embodiment in which the build platform 308 may be segmented to load the springs 310 at segmented sections along the build platform 308.

Figure 4A:
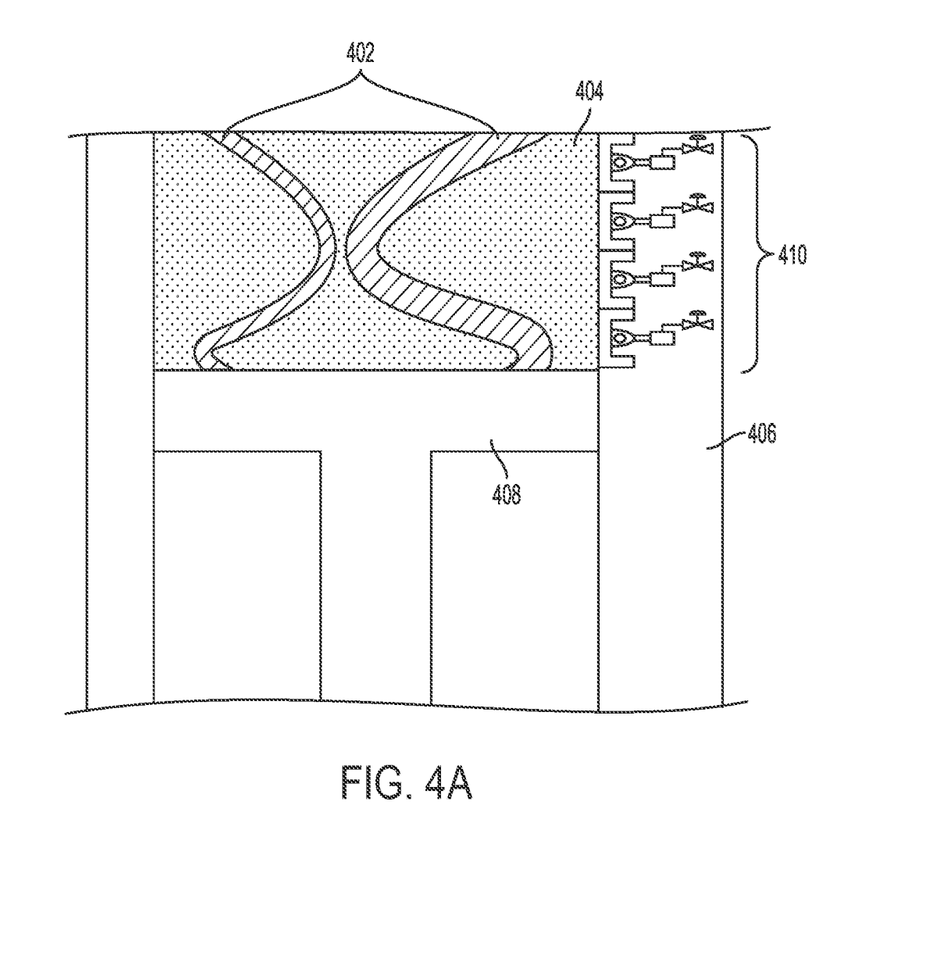
FIGS. 4A and 4B are diagrams of a powder bed box, according to another embodiment of the present invention.
Figure 4B:
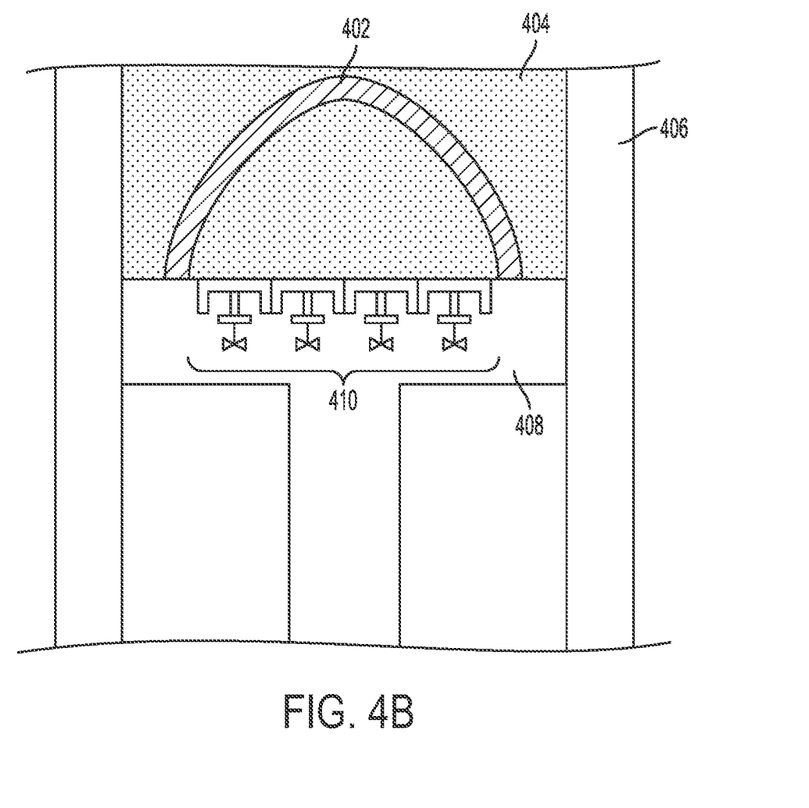

FIGS. 4A and 4B are diagrams of a powder bed box, according to another embodiment of the present invention. As shown in FIG. 4A, during the build process, a build platform 408 is lowered and then, another layer of powder is spread over a powder bed 404 to grow part 402. The process is repeated until the part 402 is completely built up from melted or sintered powder material. According to an embodiment of the present invention, the powder bed 404 may include a segmented chamber wall 406. Each segmented portion of the chamber wall 406 may be loaded with actuators 410. The actuators 410 may be, but are not limited to, pneumatic, hydraulic, or electrical type actuators. In another embodiment, as shown in FIG. 4B for example, the build platform 408 may be segmented with the actuators 410.

Figure 5A:
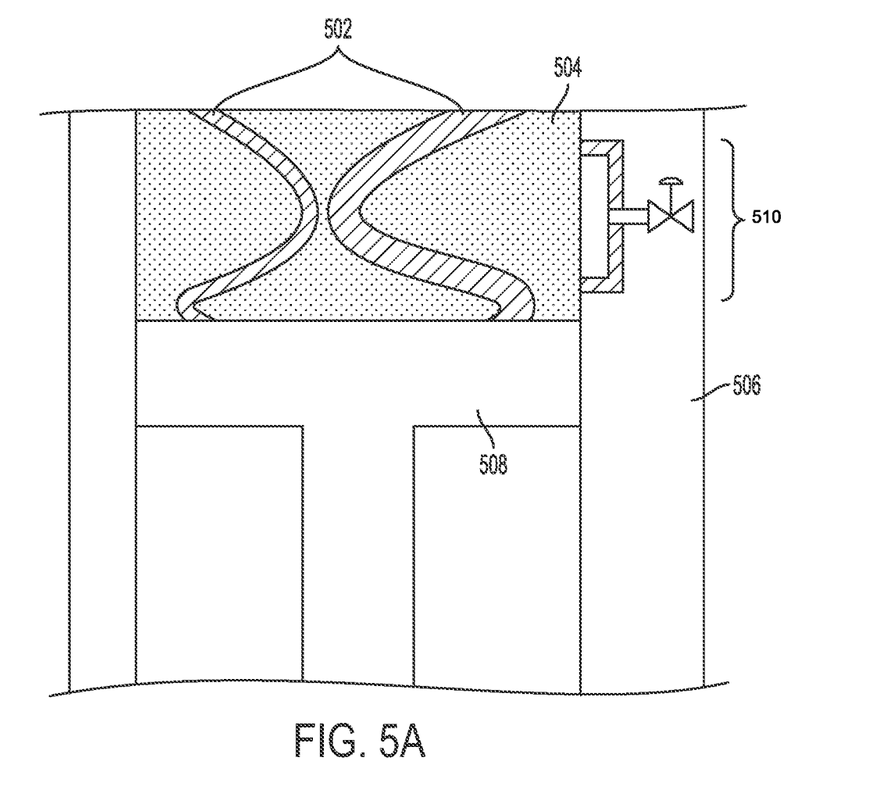
FIGS. 5A and 5B are diagrams of a powder bed box, according to another embodiment of the present invention.
Figure 5B:
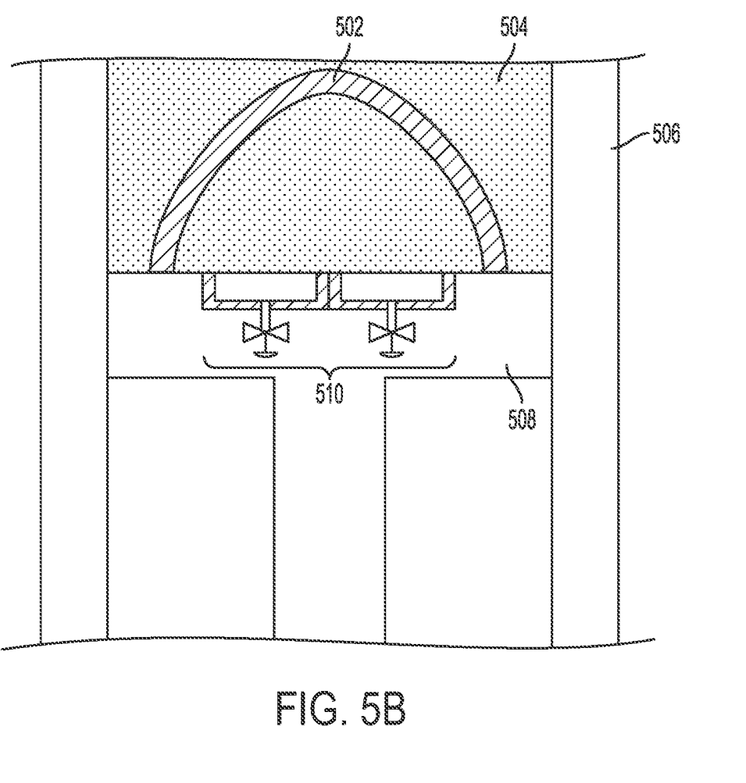

FIGS. 5A and 5B are diagrams of a powder bed box, according to another embodiment of the present invention. As shown in FIG. 5A, during the build process, a build platform 508 is lowered and then, another layer of powder is spread over a powder bed 504 to grow part 502. The process is repeated until the part 502 is completely built up from melted or sintered powder material. According to an embodiment of the present invention, the powder bed 504 may include a segmented chamber wall 506. Each segmented portion of the chamber wall 506 may be loaded with fluid pressure valves 510. The valves 510 may be, but are not limited to, pneumatic, hydraulic, or electrical type valves. FIG. 5B shows an exemplary embodiment in which the build platform 508 may be segmented with valves 510.

Figure 6A:
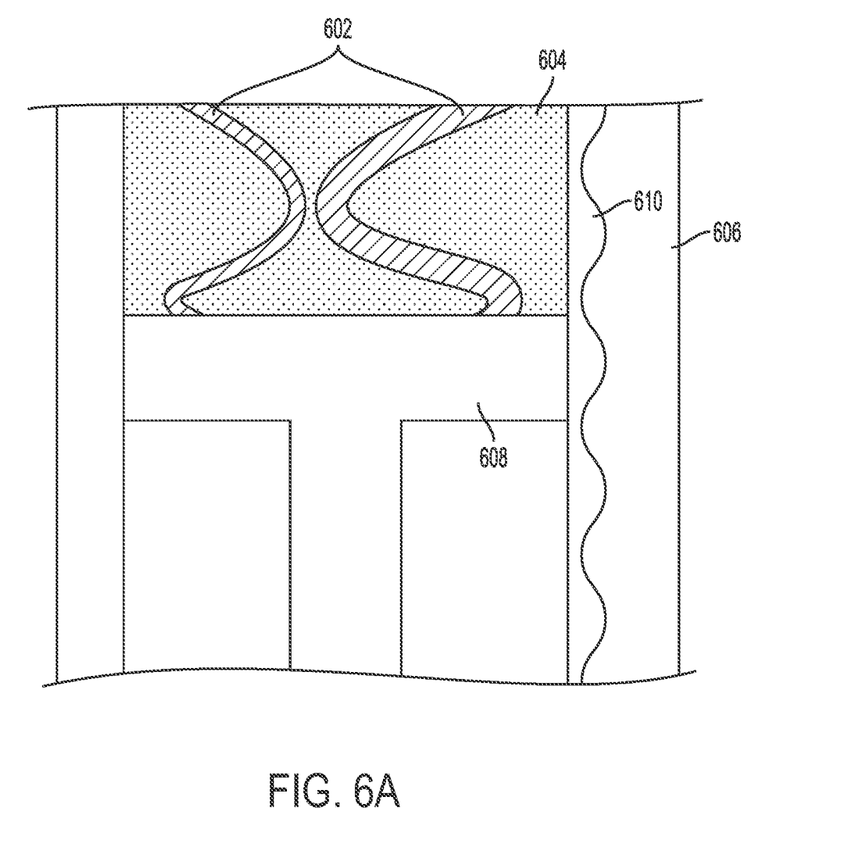
FIGS. 6A and 6B are diagrams of a powder bed box, according to another embodiment of the present invention.
Figure 6B:
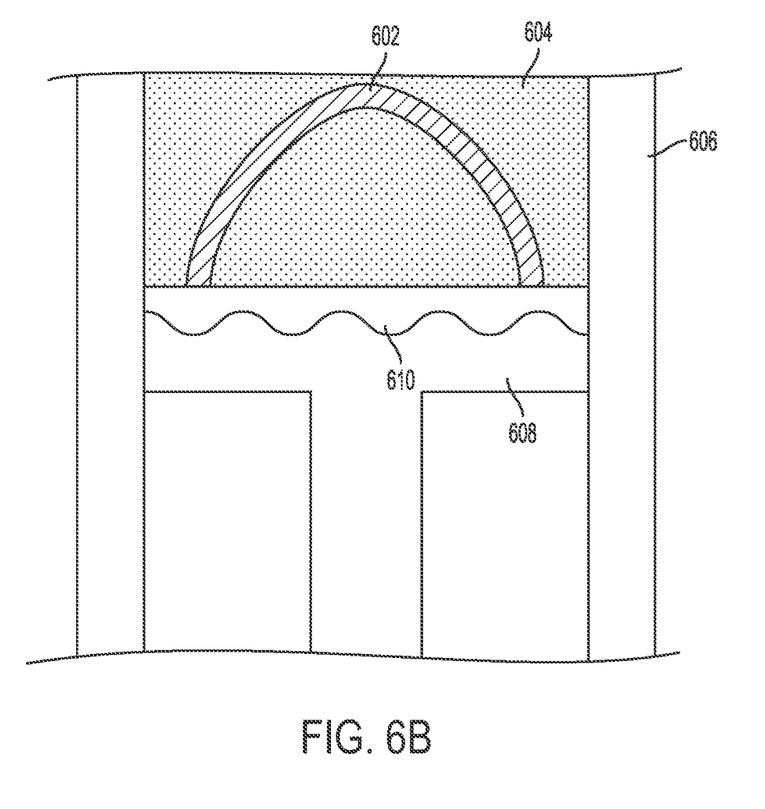

FIGS. 6A and 6B are diagrams of a powder bed box, according to another embodiment of the present invention. As shown in FIG. 6A, during the build process, a build platform 608 is lowered and then, another layer of powder is spread over a powder bed 604 to grow part 602. The process is repeated until the part 602 is completely built up from melted or sintered powder material. According to an embodiment of the present invention, the powder bed 604 may include a chamber wall 606 configured to deflect or bend (610) and compensate for the structural loading placed on the part 602 in the powder bed 604. In another embodiment, as shown in FIG. 6B, the build platform 608 may be configured to deflect or bend (610).

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An additive manufacturing apparatus for building an object, comprising:
    a build chamber, having at least one chamber wall;
    a powder delivery mechanism; and
    a build platform, the build chamber and the build platform defining while in operation a powder bed,
    wherein at least one surface of the build chamber or build platform is moveable in a manner that is capable of adjusting forces on the object in the powder bed,
    wherein the at least one chamber wall of the build chamber is segmented and each segmented portion is loaded with springs.

2. The apparatus of claim 1, wherein the at least one surface of the build chamber or build platform includes an energy absorbing component configured to control pressure in the powder bed.

3. The apparatus of claim 1, wherein the at least one surface of the build chamber or build platform moves to adjust the forces in the powder bed according to a thermal state of the powder bed during the building of the object.

4. The apparatus of claim 1, wherein the powder bed is configured with a compensating component to compensate for dimensional differences resulting from a thermal state of the object and the powder bed.

5. The apparatus of claim 1, wherein the at least one surface of the build chamber or build platform is configured with a bendable portion.

6. An apparatus for additive manufacturing of an object, comprising:
    a powder dispenser;
    an irradiation source;
    a platform on which the object is built;
    a recoater providing layers of powder over the platform; and
    a powder bed having chamber walls, at least one of the chamber walls having a movable portion,
    wherein the at least one of the chamber walls is segmented and each segmented portion is loaded with springs.

7. The apparatus of claim 6, wherein the movable portion includes an energy absorbing component configured to control pressure in the powder bed.

8. The apparatus of claim 6, wherein the movable portion moves to adjust volume in the powder bed according to a thermal state of the powder bed during the building of the object.

9. The apparatus of claim 6, wherein the powder bed is configured with a compensating component to compensate for dimensional differences resulting from a thermal state of the object and the powder bed.

10. The apparatus of claim 6, wherein the movable portion is configured with a bendable mechanism.

* * * * *